United States Patent [19]
Eriksson

[11] Patent Number: 6,141,562
[45] Date of Patent: Oct. 31, 2000

[54] SYSTEM AND METHOD RELATING TO CORDLESS COMMUNICATIONS

[75] Inventor: Dick Eriksson, Haninge, Sweden

[73] Assignee: Telefonaktiebolaget LM Ericsson, Stockholm, Sweden

[21] Appl. No.: 08/948,522

[22] Filed: Oct. 10, 1997

Related U.S. Application Data

[63] Continuation of application No. 08/366,469, Dec. 30, 1994.

[51] Int. Cl.$^7$ ...................................................... H04Q 7/20
[52] U.S. Cl. ............................ 455/555; 455/403; 455/560
[58] Field of Search ..................................... 455/403, 422, 455/426, 433, 462, 463, 465, 524, 554, 555, 560, 561

[56] References Cited

U.S. PATENT DOCUMENTS

| | | | |
|---|---|---|---|
| 5,305,315 | 4/1994 | Lee | 370/84 |
| 5,337,344 | 8/1994 | Alvessalo | 455/433 |
| 5,438,609 | 8/1995 | Yahagi | 379/58 |
| 5,461,620 | 10/1995 | Bergler et al. | 370/84 |
| 5,469,496 | 11/1995 | Emery et al. | 379/58 |
| 5,513,183 | 4/1996 | Kay et al. | 455/422 |
| 5,537,610 | 7/1996 | Mauger et al. | 379/58 |
| 5,557,654 | 9/1996 | Maenpas | 455/433 |
| 5,561,840 | 10/1996 | Alvesalo et al. | 455/433 |

FOREIGN PATENT DOCUMENTS

| | | |
|---|---|---|
| 462 727 | 12/1991 | European Pat. Off. . |
| WO94/16531 | 7/1994 | WIPO . |
| WO94/26073 | 11/1994 | WIPO . |

OTHER PUBLICATIONS

Harry Newton, "Newton's Telecom Dictionary", PP. 768–769, Nov. 1994.

Taketsugu et al., OAI Based Multi–Site Business Cordless Telephone System, NEC Research and Development, vol. 32, No. 3, pp. 447–452, Jul. 1, 1994.

CCITT Recommendation G.703, "Physical/Electrical Characteristics of Hiearchical Digital Interfaces", pp. 1–39 (1991).

CCITT Recommendation G.704, "Synchronous Frame Structures Used at Primary and Secondary Hierarchical Levels", pp. 1–32 (1991).

CCITT Recommendation G.711, "Pulse Code Modulation (PCM) of Voice Frequencies," pp. 175–184 (1972).

ITU–T Recommendation G.731, "Primary PCM Multiplex Equipment for Voice Frequencies," p. 1 (1988).

ITU–T Recommendation G.732, "Characteristics of Primary PCM Multiplex Equipment Operating at 2048 kbit/s," pp. 1–7 (1988).

CCITT Recommendation G.733, "Characteristics of Primary PCM Mulitplex Equipment Operating at 1544 kbit/s," pp. 1–4 (1972).

ITU–T Recommendation G.733, "Characteristics of Primary PCM Multiplex Equipment Operating at 1544 kbit/s," pp. 10–18 (1988).

Standard ECMA–141 prl–ETS 300 170, "Private Telecommunication Networks (PTN) Inter–Exchange Signalling Data Link Layer Protocol" (1992).

Standard ECMA–143 prETS 300 172, "Private Telecommunication Networks (PTN) Inter–Exchange Signal Protocol Circuit Mode Basic Services" (1992).

(List continued on next page.)

*Primary Examiner*—Dwayne D. Bost
*Assistant Examiner*—Nay Maung
*Attorney, Agent, or Firm*—Burns, Doane, Swecker & Mathis, L.L.P.

[57] ABSTRACT

An arrangement for providing mobility in a communications system comprising a number of private branch exchanges to which a number of radio exchanges are connected over an interface and wherein a number of cordless extensions are connected to each private branch exchange over the radio exchanges. Between each private branch exchange and at least one radio exchange mobility serving means are arranged which in interworking with the private branch exchange emulate a radio exchange, thus providing cordless mobility between a number of radio exchanges.

25 Claims, 4 Drawing Sheets

OTHER PUBLICATIONS

Standard ECMA–165 prETS 300 239, "Private Telecommunication Networks (PTN) Inter–Exchange Signal Protocol Generic Functional Protocol for the Support of Supplementary Services" (1992).

ETSI, DE/BTC–01010, Version 2.3, "Private Telecommunication Network (PTN) Cordless Terminal Mobility (CTM): Roaming Location Handling Services Service Description" (Oct. 20, 1993).

ETSI, DE/BTC–01035, Version 2.3, "Private Telecommunication Network (PTN) Cordless Terminal Mobility (CTM): Call Handling Additional Network Features Service Description" (Oct. 22, 1993).

G. Havermans et al., "Mobility in Private Networks," Philips Telecommunication Review, vol. 51, No. 2, pp. 35–40 (Aug. 2, 1993).

A. Kohtala, "Privatel—A Parallel Extension Tailored for Large User Groups," Fifth Mordic Seminar on Digital Mobile Radio Communications, Helsinki, Finland, pp. 69–72 (Dec. 1–3, 1992).

G. Linder et al., "Business Communication and Network Support," Ericsson Review, vol. 64, No. B, pp. 6–10 (1987).

M. Taketsugu et al., "OAI Based Multi–Site Business Cordless Telephone System," NEC Research and Development, vol. 32, No. 3, pp. 447–452 (Jul. 1, 1991).

FIG. 1
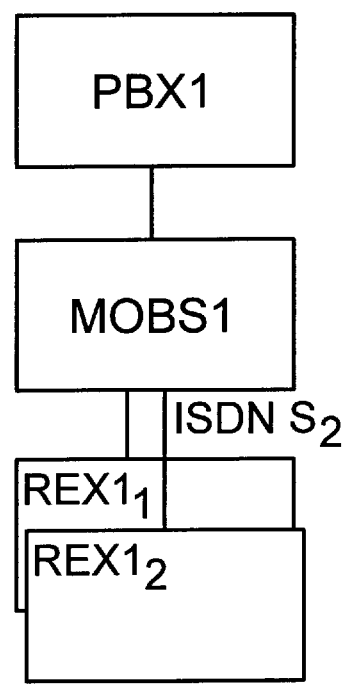
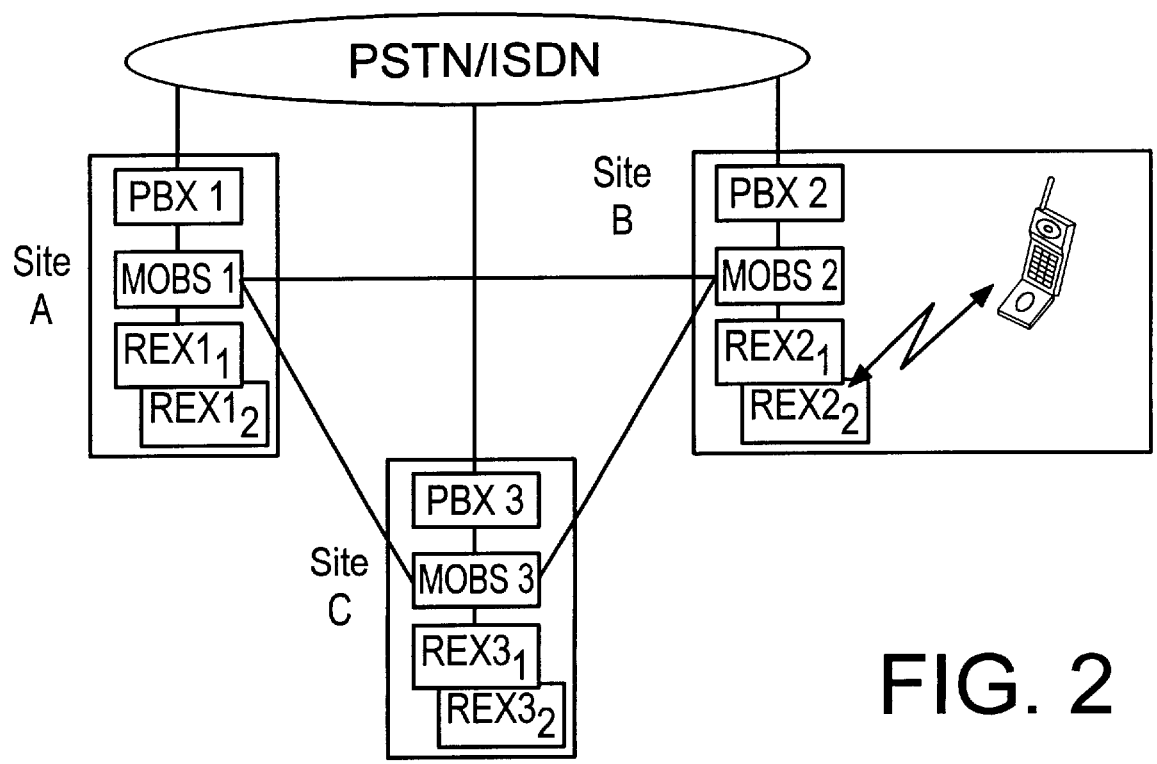
FIG. 2

SYSTEM AND METHOD RELATING TO CORDLESS COMMUNICATIONS

This application is a continuation of application Ser. No. 08/366,469, filed Dec. 30, 1994.

BACKGROUND

The present invention relates to an arrangement and a method for providing cordless mobility in a telecommunications system comprising a private network.

The invention also relates to an arrangement for providing cordless access to the services provided by an exchange also when a cordless phone is not within coverage of a radio exchange adjunct to the exchange. Sure an exchange may e.g. relate to a private branch exchange, a centrex etc. The invention further relates to a telecommunications system comprising a private network wherein cordless mobility is provided and wherein cordless access to services offered by e.g. a private branch exchange is provided.

In general a cordless portable telephone can access a private branch exchange and the services provided thereby in a way which is similar to that of a normal desk telephone using DTMF (Dual Tone Multiple Frequencies) signalling as long as the cordless phone is within the radio coverage of a radio exchange (radio switch) adjunct to the private branch exchange. If however the cordless telephone is not within radio coverage of a radio exchange adjunct to the private branch exchange it can not be used and the user instead has to use for example a PSTN (Public Switched Telephone Network) phone, a cellular phone or a desk phone in the private network. This means that the user has to change phones which is an apparent drawback since the user has to have at his disposal two different phones having two different directory numbers etc.

In a system described in WO 94/16531 is illustrated an arrangement for establishing telephone links in a communications system by call transmission. A connection is provided between a number of radio exchanges and mobility is provided between them. Here a link thus is provided between the already existing private network and the links provided therein. This implies that in order to support those links, the private branch exchanges have to fulfil a number of requirements. Signalling between nodes independently of the private branch exchange will not be achieved and since existing private branch exchanges are used for providing the connections, the services offered will be limited and it will not be possible to get access to all the extension services existing in each of the nodes of the private network.

SUMMARY

It is an object of the present invention to provide an arrangement through which cordless phone access to a private network is provided regardless of whether the user is within radio coverage of a radio exchange interfacing an exchange or not (e.g. a private branch exchange). More particularly it is an object of the present invention to provide an arrangement through which a cordless portable user can access any of a number of e.g. private branch exchanges within a (private branch) exchange (PBX) network. Furthermore the invention is not limited to private branch exchanges, e.g. it also relates to centrex exchanges or e.g. more generally to Private Telecommunications Network Exchanges (PTNX). These are defined by ETSI (European Telecommunications Standard Institute) as: "A PTN nodal entity that provides automatic switching and call handling functions used for the provision of telecommunication services. A nodal entity consists of one or more nodes. The nodal entity, performing the functions outlined above, can be implemented by equipment located on the premises of the private network administrator or by equipment co-located with, or physically part of a public network." Two implementations of PTNX are:

PBX; An implementation of a private telecommunications network exchange located on the premises of a private network administrator.

Centrex: An implementation of a private telecommunications network exchange not located on the premises of a private network administrator. Consequently whenever referring to a PBX in the present application this is not for a limitative purpose but a PBX is here defined as also comprising other exchanges.

PBX is in this document also defined as meaning Private Automatic Branch Exchange PABX.

Still further it is an object of the present invention to interconnect a number of private branch exchanges whether or not there is an existing private branch exchange network so that cordless mobility is provided. Thus according to various aspects of the invention it is an object to provide mobility between cordless users within radio coverage of different radio exchanges (REX) interfacing one and the same private branch exchange (PBX) and/or between cordless users within radio coverage of radio exchanges (REX) adjunct to different private branch exchanges. Mobility or mobility management comprises two basic services, namely roaming and hand-over.

Roaming is according to ETSI/RES 3 (European Telecommunications Standard Institute, Technical Committee RES 3) described as "The process whereby a portable part can initiate and receive calls on more than one fixed part".

A portable part here means a cordless phone and a fixed part means a base station and its associated radio exchange.

This means that when a user moves from one location to another, the new location is automatically reported to the location register of the mobility network. The location register information is essential for both incoming and outgoing calls to/from the user.

Hand-over is by ETSI/RES 3 described as "The process of switching a call in progress from one physical channel to another channel". There are different types of hand-over, namely intra-cell hand-over relating to a hand-over within a base station coverage and inter-cell handover meaning a hand-over between two different base stations which can be connected to the same or to different radio exchanges.

Still further it is an object of the present invention to provide an arrangement through which the services provided by a private branch exchange can be accessed by a cordless user throughout a private network. Moreover it is an object of the present invention to provide an arrangement through which cordless coverage can be extended over a whole private network and through which given or specific phone services such as DTMF phone services of private branch exchanges can be maintained across the whole private network without any networking support from the private branch exchange or without imposing requirements on the private branch exchange itself.

These as well as other objects are achieved through an arrangement and a method respectively wherein mobility serving means particularly referred to as a mobility server is arranged between a private branch exchange and a number of radio exchanges interfacing the private branch exchange using the existing interface from the private branch exchange wherein the mobility serving means emulates a radio exchange in interworking with the private branch exchange.

Since the interface from the private branch exchange is unchanged no modification as to the software or the hardware of the private branch exchange is required by the mobility serving means, hereinafter referred to as the mobility server (MOBS). The mobility server can interface one or more radio switches depending on the circumstances, e.g. depending on the radio coverage that is wanted and on the number of portable phones to be supported etc. The mobility server thus provides mobility for cordless users between several radio exchanges (REX) without imposing any new requirements on the private branch exchange. Mobility for cordless users between a number of private branch exchanges is achieved through arranging mobility servers between a number of private branch exchanges and the radio exchanges (REX) interfacing the particular private branch exchanges and creating an overlay network of mobility servers.

The copending U.S. patent application "System and method relating to cellular communications" filed by Applicant on Dec. 30, 1994, which is incorporated herein by reference relates to access by cellular telephones to a private branch exchange or a private network and to services provided thereby.

It is an advantage of the present invention that the capacity relating to the number of cordless phones and to the radio coverage area is increased. Another advantage with the invention is that an extension can replace for example a desk phone with the cordless phone and still keep the directory number, i.e. the numbering gets flexible and the same number can be used whether using e.g. a desk phone or a cordless phone etc.

A particular advantage with the invention is that the services provided by a private branch exchange are also available to a cordless user either within the site of a private branch exchange or within a network of sites of private branch exchanges.

BRIEF DESCRIPTION OF THE DRAWINGS

The invention will in the following be further described in a non-limiting way under reference to the accompanying drawings wherein:

FIG. 1 illustrates a mobility server arranged between a private branch exchange and a radio exchange, FIG. 2 illustrates a network of sites.

DETAILED DESCRIPTION

Figure 3:
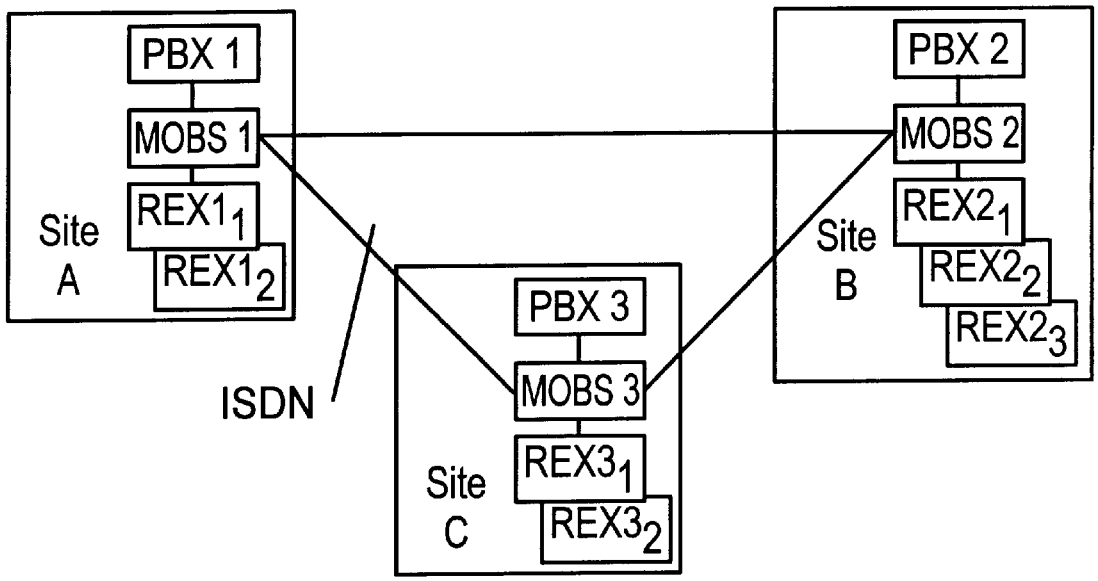
FIG. 3 illustrates an overlay network formed by three mobility servers in the case when no private branch exchange network exists.

FIG. 1 illustrates mobility serving means, as referred to above also denoted mobility server, MOBS which is arranged between a private branch exchange PBX and two radio exchanges $REX_1$, $REX_2$. Of course it is just in this particular embodiment that the mobility server interfaces two radio exchanges; it can also interface one REX or more than two REXes. In known systems one or more REXes Interface a PBX. When a mobility server is arranged between a PBX and a number of REXes, the existing interface to the PBX is used and it does not have to be changed. Therefore no modification to the PBX software or the PBX hardware is required. In interworking with the PBX, the mobility server MOBS emulates a radio exchange. In the particular embodiment as shown in FIG. 1, the mobility server offers mobility for cordless users between $REX_1$ and $REX_2$, and since the interface to the PBX remains unchanged the PBX does not have to meet any further requirements. In the shown embodiment the mobility server interfaces the two radio exchanges $REX_1$, $REX_2$ on the ISDN $S_2$ interface.

The S reference point is adopted in PBX systems as the access interface for extension lines. The $S_2$ indicates a 2 Mbps primary rate interface (30B+D).

Similarly an $S$, interface indicates a 1.5 Mbps primary rate interface (23B+D) used mainly in the USA. The primary rate interface and its D-channel control singalling allows for traffic concentration, i.e. more than 30 or 23 users can be allocated to one interface ($S_2$ or S, respectively).

Through this arrangement a cordless user is provided with access to the PBX over an extension line. Therefore the cordless user will be represented in the PBX with a directory number, a class of service, a number of accessible features and a line status. Then both a desk telephone and a cordless telephone can use the same directory numbers from the same directory number series. Furthermore, the PBX will provide the same functions to a roaming cordless user as to a cordless user who is within radio coverage of a REX adjunct to the PBX in a manner known per se. In general it applies to all services provided by a PBX but here merely a few examples are given such as extension initiated services, for example enquiry and transfer, diversion services, busy line services for incoming calls such as call-back etc.

Furthermore, operator services, call accounting services and private network services, for example least cost routing etc. can be provided to a roaming cordless user. The embodiment as described in FIG. 1 relates to providing mobility for cordless users who are within radio coverage of radio switches $REX_1$, $REX_2$ which are adjunct to one and the same PBX. In FIG. 2 a further embodiment will be illustrated wherein mobility for cordless users who are within radio coverage of radio exchanges adjunct to different private branch exchanges.

In FIG. 2 a number of private branch exchanges PBX1, PBX2, PBX3 interface the public switched telephone network PSTN or the Integrated Services Digital Network ISDN. On a first site A a mobility server MOBS1 is arranged between the PBX1 and a number of radio exchanges $REX1_1$, $REX1_2$. Similarly, on site B a mobility server MOBS2 is arranged between a PBX2 and $REX2_1$, $REX2_2$ and on site C a mobility server MOBS3 is arranged between a PBX3 and $REX3_1$ $REX3_2$. The mobility servers $MOBS_1$, $MOBS_2$, $MOBS_3$ interface each other to form an overlay network of mobility servers which provides cordless users with a network wide mobility. Thus mobility for cordless users is extended from just one site to a network of sites. The sites as defined herein (site A, site B, site C) may coincide or not with the "normal" sites of the PBXes. According to different embodiments there are different levels of integration between the existing PBXes and the ISDN network of adjunct mobility servers.

In the following three different embodiments will be further discussed depending on whether the private branch exchanges are networked or not.

In the embodiment illustrated in FIG. 3 the private branch exchanges are not so interconnected as to form a network. There are three separate sites A, B, C, each comprising a PBX1, PBX2, PBX3 and a mobility server MOBS1, MOBS2, MOBS3 which interfaces a number of radio exchanges $REX1_1$, $REX1_2$; $REX2_1$, $REX2_2$, $REX2_3$; $REX3_1$, $REX3_2$. In order to provide cordless mobility, an overlay network is formed by the mobility servers through interconnecting them over an interface supporting ISDN signalling or digital connections. On each site the network is linked to the respective PBX. User information (B-channels) and control signals (D-channel) are carried in the overlay network formed by the mobility servers.

Figure 4:
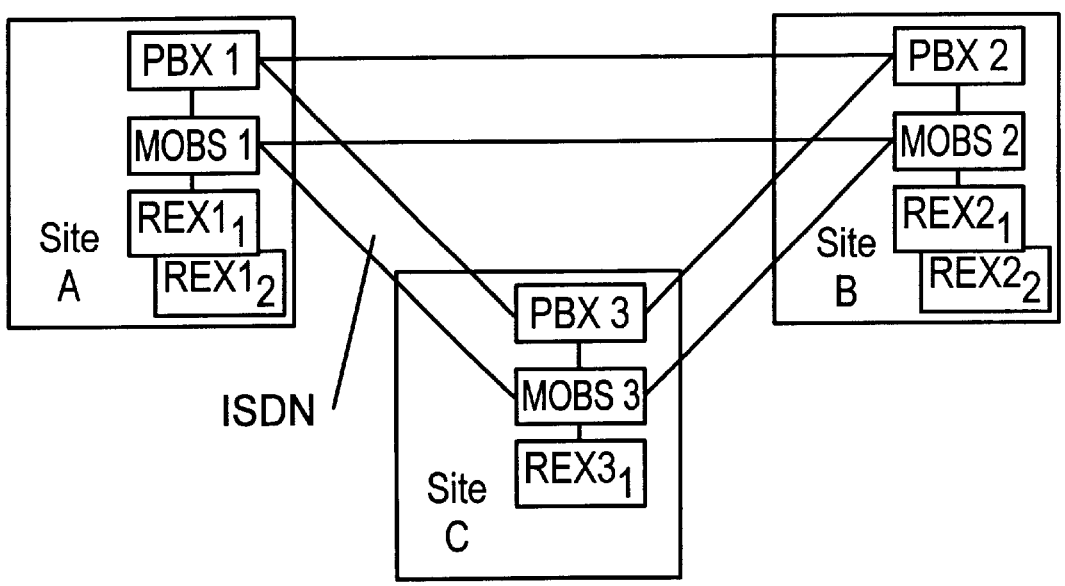
FIG. 4 illustrates an overlay network formed by mobility servers when a PBX network exists which does not support ISDN (Integrated Services Digital Network) signalling or digital connections.
Figure 5:
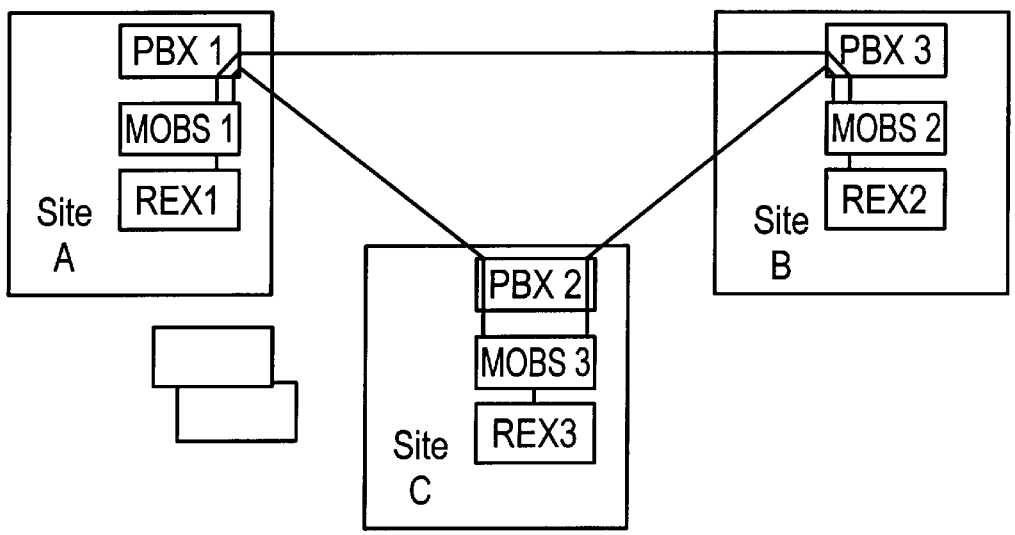
FIG. 5 illustrates signalling between mobility servers when a PBX network supports ISDN signalling or digital signalling.

In FIG. 4 one embodiment is shown wherein a PBX network already exists. However, in this particular embodiment the PBX network does not support ISDN signalling and it does also not support digital connections. Here like in the foregoing embodiment, user information as well as control signals are carried in the overlay network formed by the mobility servers. The same reference signs are used in this figure as in FIG. 3. If fixed modem connections are used for ISDN signalling, an analog PBX network can be used. In the embodiment as illustrated in FIG. 5 an ISON PBX network or a PBX network exists which supports digital connections. This means that this network, i.e. the PBX network, also can support signalling and traffic between the mobility servers. Also here the same reference signs denote the same features as in FIG. 3 and FIG. 4. The PBX network provides semi-permanent connections on which the signalling between the mobility servers can be carried. For example the "D-over-B concept" for ISDN signalling can be used. The D-over-B concept means that the D-channel, which carries control signals, in set up over a B-channel end-to-end between two nodes in a network. The B-channel is a bearer. The network supports digital transmission and can be ISDN or just a switched PCM network. It can be a private or a public network.

In an alternative embodiment relating to the case wherein a PBX network supporting digital connections already exists, or to the case wherein PSTN supporting switched digital connections exists, so called "dynamic route allocation" can be used in order to adapt a number of reserved connections to the actual traffic situation in the overlay network. This will give a more cost efficient network. Dynamic route allocation is a service specified by ETSI (European Telecommunication Standards Institute) which provides a semipermanent route between two nodes over a switched network. The number of B-channels in the route can be dynamically controlled by the two nodes in order to match the actual traffic load and thus reduce transmission costs.

Figure 6:
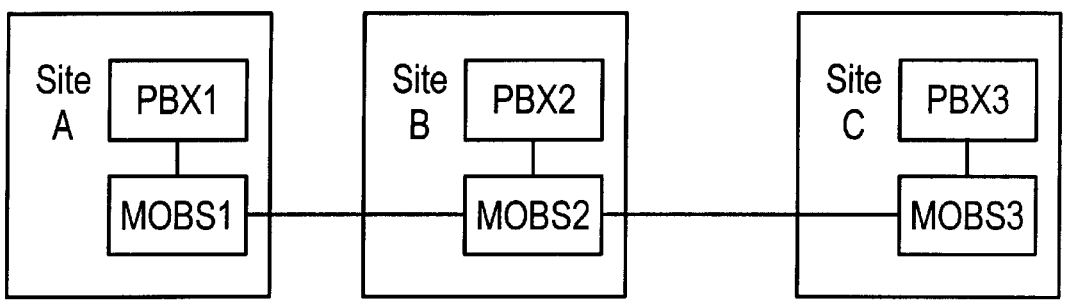
FIG. 6 illustrates an embodiment wherein a mobility server acts as a transit node.
Figure 7:
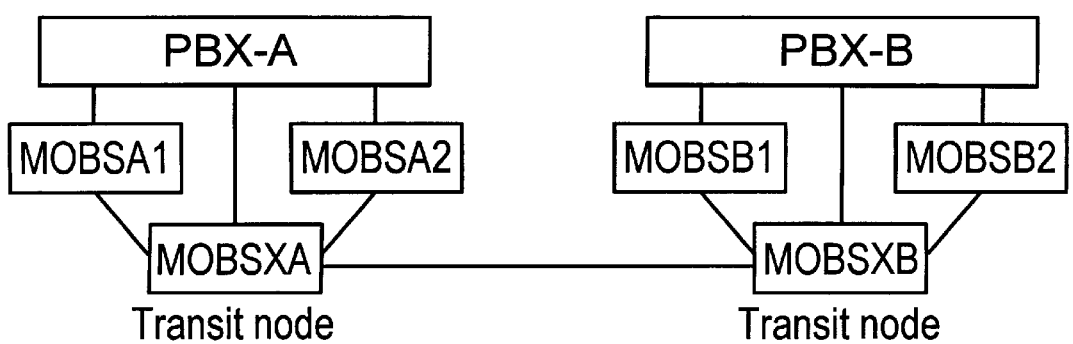
FIG. 7 illustrates an embodiment with a large network wherein a number of mobility servers are networked and some of the mobility servers act as transit nodes.

In FIGS. 6 and 7 concepts are illustrated which are based on the application of transit nodes. In FIG. 6 a mobility server MOBS2 acts as a transit node between mobility server MOBS1 interfacing a PBX1 on site A and mobility server MOBS3 interfacing a PBX3 on a site C and thus there does not have to be interconnection between every mobility server.

FIG. 7 is a very schematical illustration of a network with large sites wherein each site requires a number of networked mobility servers. In site A a PBX-A is interfaced by two mobility servers and MOBS A1, MOBS A2 which in turn interface with a transit node MOBS XA. The corresponding arrangement is relevant also to site B and the transit nodes formed by the mobility servers MOBS XA and MOBS XB are interfaced with each other.

The concept of transit nodes can as referred to above be used when the sites are large but it can for example also be used in large networks comprising many nodes. Of course it can also be used under any other circumstances when it is found appropriate.

Figure 8:
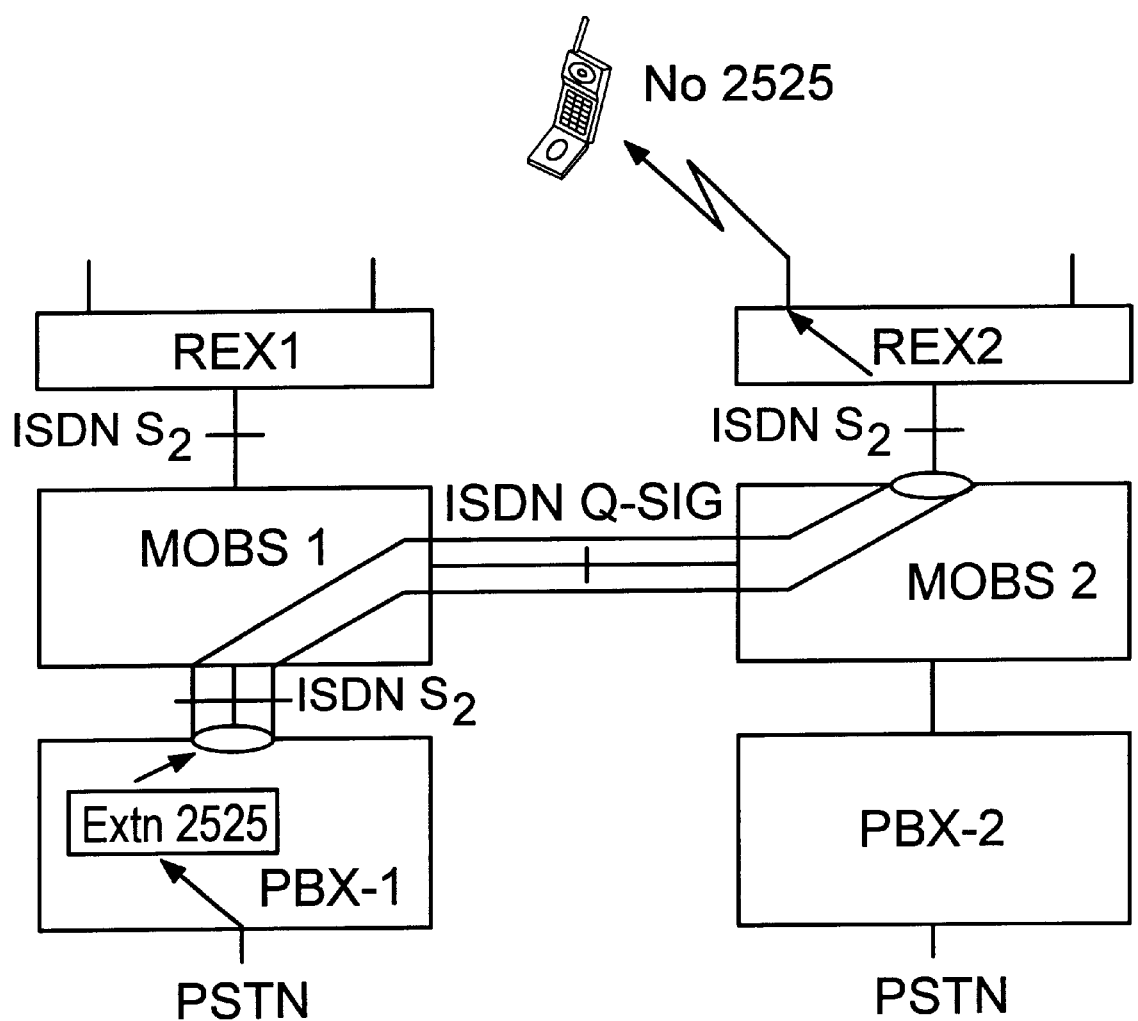
FIG. 8 illustrates transparent access signalling between a cordless telephone and a private branch exchange.

Under reference to a particular embodiment as shown in FIG. 8 the interworking of a mobility server with a radio exchange and a private branch exchange respectively will be discussed as well as the signalling within an overlay network formed by a number of mobility servers. Of course the principles as discussed in relation to this embodiment are also valid to other embodiments, as for example those described in the foregoing examples. The interwork between a PBX or in the shown embodiment PBX1, with the mobility server and MOBS1 can take place using any type of extension interface. The extension interface may for example provide concentrated access e.g. via the ISDN $S_2$ interface or may provide multiplexed access over the PCM/CAS interface but it may also be an analogue line. PCM (Pulse Code Modulation) is a common transmission technique worldwide. ITU (formerly CCITT) has issued a number of recommendations for this technique. CAS (Common Channel Signalling) indicates that all bearer channels share one signalling channel for line signalling information. The CCITT recommendations in series G.700–G.795 describe general aspects of digital transmission systems. In particular the following CCITT recommendations apply to PCM and CAS as to be applied in the described application: G.703 "Physica/electrical characteristics of hierarchical digital interfaces", G.704 "Synchronous frame structures used at primary and secondary hierarchical levels", G.711 "Pulse code modulation of voice frequencies", G.731 "Primary PCM multiplex equipment for voice frequencies", G.732 "Characteristics of primary PCM multiplex equipment operating at 2.048 Mbps", G.733 "Characteristics of primary PCM multiplex equipment operating at 1.544 Mbps", Q.512 "Exchange interfaces for subscriber access".

The interworking between REX1 and MOBS1 (and REX2 anad MOBS2) is effected via the ISDN $S_2$ interface supporting intelligent D-channel signalling e.g. for mobility management. The overlay network formed by a number of mobility servers, in this case MOBS1 and MOBS2, acts as an access network between REXes and PBXes (here REX1 and REX2). Now a new concept is introduced, namely the application of home-PBXes. This implies that each cordless user is an extension In a specific PBX, the home-PBX, as any conventional extension, also non-mobile extensions, with a directory number, a class-of-service, a number of accessible features and a line status. Connections to and from a cordless user such as incoming and outgoing calls are always routed through the home-PBX. In the illustrated example PBX1 forms a home-PBX for the portable 2525. The overlay network of mobility servers MOBS1, MOBS2 uses in this embodiment ISDN Q-SIG private network signalling for mobility management. The signalling provides transparent access signalling between portables and the private branch exchange. Q-SIG is an ISDN network protocol set for private networks specified by ETSI. The following ETSI standards apply to basic call and as a basis for supplementary services: ETS 300 170, "Data link layer protocol at the Q reference point for the signalling channel between two private telecommunication network exchanges", ETS 300 172, "Layer 3 protocol for signalling between exchanges of private telecommunication networks for control of circuit switched calls", ETS 300 239, "Generic fuctional protocol for the support of supplementary services". The following draft ETSI standards apply to cordless mobility in private networks: QSIG-CTAU, "Cordless terminal authentication", QSIG-CTLR, "Cordless terminal location registration" QSIG-CTMI, "Incoming CTM call handling", QSIG-CTMO, "outgoing CTM call handling".

Mobility management signalling between the mobility servers MOBS1 and MOBS2 is in an advantageous embodiment carried in ISDN Q-SIG facility information elements in agreement with standards proposed by ETSI/ECMA for private network cordless mobility. (ECMA relates to a standard body (formerly European Computer manufactures Association) standardizing information and communication systems, e.g. private telecommunications networks.) In order to provide for authentication the DECT (Digital European Cordless Telecommunications Standard; the standard e.g. specifies the radio interface between a cordless portable and a base station. The standard is specified by the technical committee RES3 of ETSI.) standard may be applied. This is effected from the radio exchange REX1 via the adjunct mobility server MOBS1 across the network to an authentication database (not illustrated in the figures) In a manner known per se. Also for the identification function through which a portable automatically is identified by the network the DECT standard may be used, according to an advantageous embodiment in combination with the PTN standard. For the roaming function, updating of location register, a common database is used according to an advantageous embodiment. This common database can be used for the entire overlay network and it may for example be in the form of an internal central database but it may also take the form of an internal distributed database. In another embodiment the common database comprises a central external data base. The implementation of the data base can also be done in other ways and which implementation that is used for example depends on the size of the overlay network and the size of the extension profile etc.

For ciphering the DECT standard may be used.

What has been described in relation to FIG. 8 in general relates to mobility within a network (in the FIG. merely 2 are shown) of mobility servers. The invention however also relates to providing mobility within one site but between different radio exchanges either as a standalone function but of course also within a network. Handover between radio exchanges REX interfacing one and the same mobility server is supported by this mobility server. As referred to above the mobility server provides for transparent signalling between a radio exchange REX and a private branch exchange PBX wherein transparent signalling means that it appears that the REX and the PBX are directly interconnected without the intermediate mobility serving means. This transparent link is set up both for intra-site calls and for inter-site calls. For inter-site calls, i.e. calls between different sites, a roaming cordless portable telephone gets a direct link to its home-PBX via the overlay network. The mobility server emulates a REX in its interwork with the PBX. Through this arrangement all the extension features and services which are applicable to a DTMF extension will also be applicable to a cordless portable. These extension features may for example relate to user procedures comprising digits 0–9, * and #, as well as the R-key. The services are available both on one site and throughout the overlay network. The key-pad procedures are carried in ISDN Q-SIG facility Information elements. ECMA provides the unique object identifier. This makes the proprietary signalling information being handled as transparent information by any foreign network node supporting the generic procedures which are defined by ETSI and ECMA. Thereby a mixed network of switches can be allowed.

The invention as described in relation to the particular embodiments is of course not limited to the shown number of exchanges but a network may comprise any number thereof and take any form. The invention is also not limited to the mentioned interfaces; other interfaces can also be used as well as the invention is not limited to the mentioned standards but it is applicable using other standards as well. The examples of services provided is of course also not exclusive; a number of other services can also be provided and it is only a question of which services are provided by the private network or the private exchange.

What is claimed is:

1. An arrangement for providing mobility in a private telecommunications network comprising: a number of private telecommunications network exchanges (PTNXs) to each of which at least a number of adjunct radio exchanges having switching functionality are connected over an interface; a number of cordless extensions connected to each PTNX over the adjunct radio exchanges; and mobility serving means, disposed between each PTNX and at least one adjunct radio exchange and interfacing the PTNX on an existing interface without modification of software and hardware of the PTNX, for emulating an adjunct radio exchange in interworking with the PTNX providing cordless mobility, including service access to the PTNX, between a number of adjunct radio exchanges, wherein cordless access to the PTNX is provided over an extension line.

2. The arrangement of claim 1, wherein the mobility serving means interfaces a number of radio exchanges providing cordless mobility between the radio exchanges.

3. The arrangement of claim 1, wherein a cordless user accessing the PTNX over the extension line is represented in the PTNX by a directory number, a class-of-service, a number defining accessible features, and a line status.

4. The arrangement of claim 1, wherein the interface from the PTNX is an ISDN $S_2$ interface.

5. The arrangement of claim 1, wherein the interface from the PTNX is a PCM interface.

6. The arrangement of claim 1, wherein the mobility serving means interworks with the radio exchanges over an ISDN $S_2$ interface.

7. The arrangement of claim 1, wherein the mobility serving means interworks with the PTNX over an analog line extension interface.

8. The arrangement of claim 1, wherein a cordless phone is an extension in one of a given PTNX and a home exchange, and calls to and from a cordless user are routed through the home exchange.

9. An arrangement for providing cordless mobility including service access to private telecommunications network exchanges (PTNXs) in a private telecommunications network comprising: at least two PTNXs and at least one adjunct radio exchange that has switching functionality and that is connected to each PTNX and mobility serving means, provided between each PTNX and the at least one adjunct radio exchange connected thereto, for interfacing each PTNX on an existing interface without modification of software and hardware of the PTNX, wherein the mobility serving means are interconnected so as to form an overlay network, and cordless access to the PTNXs is provided over extension lines.

10. The arrangement of claim 9, wherein the overlay network carries both user information and control signalling.

11. An arrangement for providing cordless mobility including service access to private telecommunications network exchanges (PTNXs) in a private telecommunications network comprising: at least two PTNXs without connection therebetween; adjunct radio exchanges having switching functionality and interfacing the respective PTNXs; and mobility serving means, arranged on an existing interface between the PTNXs and the adjunct radio exchanges, without modification of software and hardware of the PTNXs, for interfacing each other and providing an overlay network of mobility serving means, cordless access to the PTNXs being provided over extension lines, wherein further user information and signaling is exclusively carried by the overlay network.

12. An arrangement for providing cordless mobility including service access to private telecommunications network exchanges (PTNXs) in a private telecommunications network comprising: a number of PTNXs interconnected so as to form a private network which does not support at least one of digital connections and ISDN signaling of exchanges; adjunct radio exchanges having switching functionality and interfacing the PTNXs; and mobility serving means, arranged between the PTNXs and the adjunct radio exchanges on existing interfaces without modification of software and hardware of the PTNXs, for interfacing different radio exchanges; wherein the mobility serving means are interconnected so as to form an overlay network which carries user information and control signals, and cordless access to the PTNXs is provided over extension lines.

13. The arrangement of claim 11, wherein the mobility serving means are interconnected over an ISDN-interface.

14. An arrangement for providing cordless mobility between a number of private telecommunications network exchanges (PTNXs) interconnected so as to form a private telecommunication network supporting at least one of ISDN signaling and digital connections comprising: adjunct radio exchanges having switching functionality for interfacing the PTNXs, and mobility serving means, interconnected and arranged between the PTNXs and the adjunct radio exchanges on an existing interface without modification of the hardware and software of the PTNXs, for forming an overlay network of mobility serving means, wherein cordless access, including service access to the PTNX, is provided over extension lines.

15. The arrangement of claim 14, wherein signals between the mobility serving means are carried over semi-permanent connections provided by the private telecommunications network.

16. The arrangement of claim 15, wherein ISDN signalling applying a D-over-B concept is used.

17. The arrangement of claim 11, wherein at least two mobility serving means are indirectly connected to each other via another mobility serving means forming a transit node.

18. The arrangement of claim 1, comprising additional mobility serving means connected to more than one mobility serving means connected to a PTNX, wherein the additional mobility serving means form a transit node connecting to a mobility serving means interfacing another PTNX.

19. The arrangement of claim 11, wherein the overlay network comprises an access network between radio exchanges and private branch exchanges.

20. The arrangement of claim 19, wherein the overlay network uses ISDN Q-SIG private network signalling.

21. The arrangement of claim 11, further comprising a database which is common for the overlay network.

22. An arrangement for providing cordless mobility between a number of adjunct radio exchanges having switching functionality and interfacing a private telecommunications network exchange (PTNX), comprising a mobility server arranged between the PTNX and the adjunct radio exchanges interfacing the PTNX on an existing interface between the PTNX and the radio exchanges without modification of software and hardware of the PTNX, wherein the mobility server emulates a radio exchange having switching functionality to the PTNX, and cordless access, including service access to the PTNX, is provided over extension lines.

23. An arrangement for providing cordless mobility within a private telecommunications network including a number of private branch exchanges to each of which a number of adjunct radio exchanges having switching functionality are interfaced, comprising a mobility server arranged between each private branch exchange and the respective adjunct radio exchanges using an existing interface between the adjunct radio exchanges and the private branch exchange, without modification of the hardware and software of the private branch exchange, wherein the mobility servers are interconnected via an interface supporting digital connections and form an overlay network, and cordless access, including service access to the private branch exchange, is provided over extension lines.

24. An arrangement for providing a cordless telephone with access to services provided by a private telecommunications network exchange (PTNX) throughout a private telecommunications network independently of whether the cordless telephone is within coverage of a radio exchange having switching functionality adjunct to the PTNX or not, comprising: between each PTNX and radio exchanges interfacing therewith, a mobility server using an existing interface without modification of the software and hardware of the PTNX and emulating a radio exchange having switching functionality to the respective PTNX wherein the mobility servers form an overlay network via ISDN-interfaces, and cordless access being provided over an extension line.

25. A method of providing a cordless user with mobility in a private telecommunications network and with access to services offered thereby, the private telecommunications network comprising at least one private branch exchange interfaced by a number of radio exchanges having switching functionality, comprising the steps of arranging mobility serving means between the radio exchanges interfacing the private branch exchange; using an existing interface for the private branch exchange without modification of the software and hardware of the private branch exchange, and if cordless mobility is desired between a number of private branch exchanges, interconnecting mobility serving means interfacing different private branch exchanges with each other, and cordless access being provided over an extension line.

* * * * *